(12) United States Patent
Akutsu et al.

(10) Patent No.: US 7,648,651 B2
(45) Date of Patent: Jan. 19, 2010

(54) SOLVENT COMPOSITION

(75) Inventors: Mitsuo Akutsu, Saitama (JP); Takahiro Otsuka, Saitama (JP)

(73) Assignee: Adeka Corporation, Tokyo (JP)

( * ) Notice: Subject to any disclaimer, the term of this patent is extended or adjusted under 35 U.S.C. 154(b) by 91 days.

(21) Appl. No.: 11/920,341

(22) PCT Filed: Apr. 18, 2006

(86) PCT No.: PCT/JP2006/308094

§ 371 (c)(1),
(2), (4) Date: Nov. 14, 2007

(87) PCT Pub. No.: WO2006/132035

PCT Pub. Date: Dec. 14, 2006

(65) Prior Publication Data

US 2009/0093588 A1    Apr. 9, 2009

(30) Foreign Application Priority Data

Jun. 9, 2005    (JP) .............................. 2005-169481

(51) Int. Cl.
*B01F 1/00*    (2006.01)
*C07C 13/00*    (2006.01)
*C07C 213/00*    (2006.01)

(52) U.S. Cl. .................. 252/364; 585/24; 564/504; 568/679

(58) Field of Classification Search ............. 252/364; 585/24; 564/504; 568/679
See application file for complete search history.

(56) References Cited

U.S. PATENT DOCUMENTS 4,565,896 A * 1/1986 Knifton et al. ............. 568/852

FOREIGN PATENT DOCUMENTS

| JP | 1-132694 | 5/1989 |
|----|----------|--------|
| JP | 2-178396 | 7/1990 |
| JP | 3-167298 | 7/1991 |
| JP | 4-68023 A | 3/1992 |

OTHER PUBLICATIONS

Thompson, Alonzo C.; Hedin, P. A., Separation of organic acids by thin-layer chromatography of their 2,4-dinitrophenylhydrazide derivatives and their analytical determination 1966, Journal of Chromatography (1966), 21(1), 13-18.*

* cited by examiner

Primary Examiner—Harold Y. Pyon
Assistant Examiner—Monique Peets
(74) Attorney, Agent, or Firm—Young & Thompson

(57) ABSTRACT

A solvent composition contains a tetralin compound (a) represented by the formula (I) and a polyether compound (b) represented by the formula (II). The solvent composition is excellent in safety and almost odorless, having a high capability of dissolving various organic materials, and also excellent in affinity to various substrates. The solvent composition is suitably used for various applications including various kinds of paints, adhesives, coating materials, detergents, and the like.

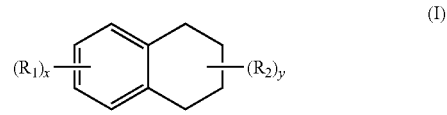

(I)

wherein x is an integer of 0 to 4; y is an integer of 0 to 8; $R_1$ and $R_2$ each independently represent an alkyl or alkoxy group having 1 to 10 carbon atoms or an alkenyl or alkenyloxy group having 2 to 10 carbon atoms; these groups may be substituted by a halogen atom; and when a plurality of $R_1$ or $R_2$ exists, $R_1$ and $R_2$ each may be the same or different,

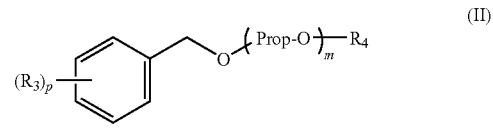

(II)

wherein m is 1 to 10; p is 0, 1, 2, or 3; Prop represents 1,2-propylene group; $R_3$ and $R_4$ each independently represent an alkyl group having 1 to 10 carbon atoms; and when m is 2 or more, a methyl substituent in the 1,2-propylene group represented by Prop may be randomly positioned.

4 Claims, No Drawings

SOLVENT COMPOSITION

TECHNICAL FIELD

The present invention relates to a solvent composition obtained by combining a specific tetralin compound and a specific polyether compound. The solvent composition is excellent in safety and almost odorless, having a high capability of dissolving various organic materials, and also excellent in affinity to various substrates.

BACKGROUND ART

In the fields of paints, adhesives, printing inks or the like, a solvent has played an important role. The solvent is basically required to have a high capability of dissolving solutes. In addition, in these fields, the solvent affects largely the wettability, drying property and the like of a coated surface.

As a solvent used together with resins such as cellulose, epoxy, acrylic, vinyl acetate, vinyl chloride, alkyd, and polyester that have been conventionally used so far in the fields of paints, adhesives, printing inks or the like, glycolether cellosolve, particularly cellosolve acetate, has been preferentially used due to the excellent properties thereof. However, in recent years, requirement for the safety of chemical substances has been intensified because of pollution problems and the like. Restriction on the use of cellosolve acetate has been tightened because of its toxicity, and a concentration standard of cellulose acetate for the working environment has been set up under the Industrial Safety and Health Law.

In view of the above circumstances, an alternative solvent that has an adequate capability of dissolving solutes comparable to cellosolve acetate and has no fears for safety issues has been developed actively.

For example, ethyl lactate, propylene glycol monomethylether acetate, methoxypropanol, ethyl β-epoxypropionate, and others have been investigated as a potential candidate for the alternative solvent. However, these are not necessarily satisfactory considering the capability of dissolving solutes, safety issues, odor, handling performance, and others. Among these, ethyl lactate that is approved as a food additive may be considered to be the most preferable in view of safety issues, but ethyl lactate is still not satisfactory in view of the capability of dissolving polymer compounds and various kinds of additives.

Further, from the viewpoint of the capability of dissolving solutes, alkyl esters of β-alkoxypropionic acid such as methyl β-methoxypropionate and ethyl β-ethoxypropionate have been considered to be the most preferable, but these are also not satisfactory in view of the capability of dissolving polymer compounds and various kinds of additives, further in view of volatility after coating.

Besides the fields of applications described above, a solvent has been used for cleaning oils such as cutting oil, working oil, pressing oil, antirust oil, lubricating oil, grease, pitch or the like. In addition, a solvent has been used for cleaning solder flux, ink, liquid crystals, and others. For these cleaning applications, there has been widely used a solvent containing mainly a halogenated solvent such as Freon 113 (1,1,2-trichloro-1,2,2-trichloroethane), methylchloroform (1,1,1-trichloroethane), and trichloroethylene. In particular, Freon 113 has been widely used because Freon 113 is not only non-flammable, less-toxic and excellent in safety, but also hardly corrode metals, plastics, elastomers and others and can selectively dissolve various kinds of stains. However, Freon 113 and methylchloroform destroy the ozone layer in the stratosphere and eventually cause skin cancer, so that the use thereof is rapidly becoming restricted. Trichloroethylene is also suspected to cause cancer and the use thereof is being restricted in view of safety issues.

In view of the foregoing, development of an alternative Freon-based cleaning agent that has cleaning properties that could replace Freon 113 and the like and has no fear of destroying the ozone layer has been carried out actively. For example, Patent Document 1 discloses a solvent containing 1,2-difluoroethane as a main component. Patent Document 2 discloses a mixture of 1,1-dichloro-2,2,2-trifluoroethane and dimethoxybenzene. Patent Document 3 discloses a solvent containing hexafluorobenzene as an essential component. However, these solvents fall short of Freon 113 in terms of the performance. In addition, the use of these halogenated solvents is becoming to be completely restricted due to environmental problems and safety issues.

Patent Document 1: Japanese Patent Laid-Open Publication No. H01-132694

Patent Document 2: Japanese Patent Laid-Open Publication No. H02-178396

Patent Document 3: Japanese Patent Laid-Open Publication No. H03-167298

DISCLOSURE OF THE INVENTION

Problems to be Solved by the Invention

Therefore, in view of the aforementioned present situation, an object of the present invention is to provide a solvent composition excellent in safety, of low level of odor, having an excellent capability of dissolving various kinds of organic materials, and also excellent in affinity to various kinds of substrates.

Means for Solving the Problems

The present inventors have made intensive studies and found that a solvent composition obtained by combining a tetralin compound and a polyether compound was able to solve the above problems.

The present invention is completed based on the above finding and provides a solvent composition containing a tetralin compound (a) represented by the following general formula (I) and a polyether compound (b) represented by the following general formula (II).

[Chemical 1]

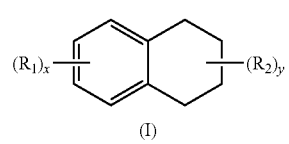

(I)

wherein x is an integer of 0 to 4; y is an integer of 0 to 8; $R_1$ and $R_2$ each independently represent an alkyl or alkoxy group having 1 to 10 carbon atoms or an alkenyl or alkenyloxy group having 2 to 10 carbon atoms; these groups may be substituted by a halogen atom; and when a plurality of $R_1$ or $R_2$ exists, $R_1$ and $R_2$ each may be the same or different,

[Chemical 2]

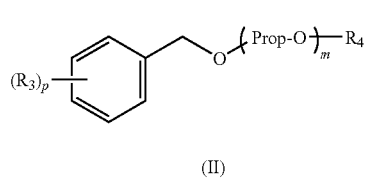

(II)

wherein m is 1 to 10; p is 0, 1, 2, or 3; Prop represents 1,2-propylene group; $R_3$ and $R_4$ each independently represent an alkyl group having 1 to 10 carbon atoms; and when m is 2 or more, a methyl substituent in the 1,2-propylene group represented by Prop may be randomly positioned.

BEST MODE FOR CARRYING OUT THE INVENTION

Hereinafter, the solvent composition of the present invention will be explained in detail.

In the general formula (I) representing the tetralin compound that is a component (a), the $C_{1-10}$ alkyl group represented by $R_1$ and $R_2$ includes, for example, methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, nonyl, isononyl, decyl, isodecyl and the like. The $C_{1-10}$ alkoxy group represented by $R_1$ and $R_2$ includes methoxy, ethoxy, propoxy, isopropoxy, butoxy, amyloxy, hexyloxy, heptyloxy, octoxy, nonyloxy, deciloxy and the like. The $C_{2-10}$ alkenyl group represented by $R_1$ and $R_2$ includes vinyl, allyl, butenyl and the like. The $C_{2-10}$ alkenyloxy group represented by $R_1$ and $R_2$ includes vinyloxy, allyloxy, butenyloxy and the like. Halogen atoms that may be used as a substituent for these alkyl, alkoxy, alkenyl, and alkenyloxy groups include fluorine, chlorine, bromine, iodine and the like.

Among these, $R_1$ is preferably a $C_{1-4}$ alkyl group. $R_2$ is also preferably a $C_{1-4}$ alkyl group.

The specific example of the tetralin compound that is a component (a) used in the present invention includes the compounds listed below. These tetralin compounds may be used alone or in a combination of two or more kinds.

[Chemical 3]

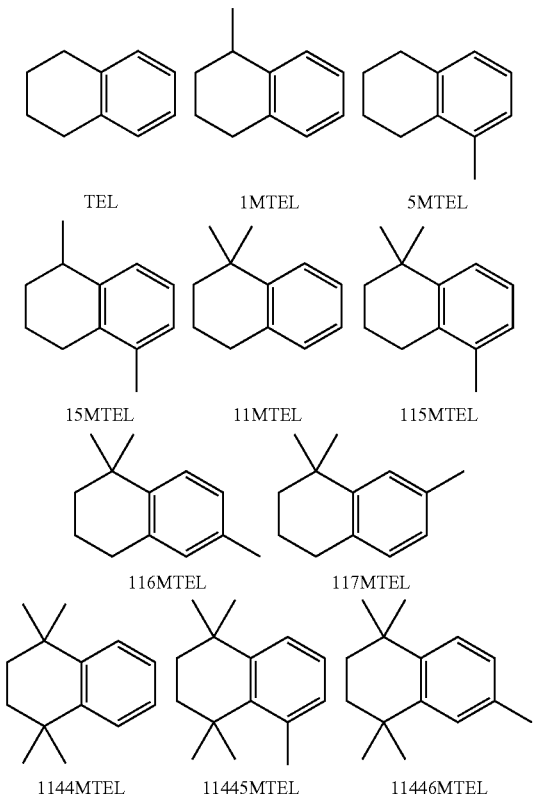

[Chemical 4]

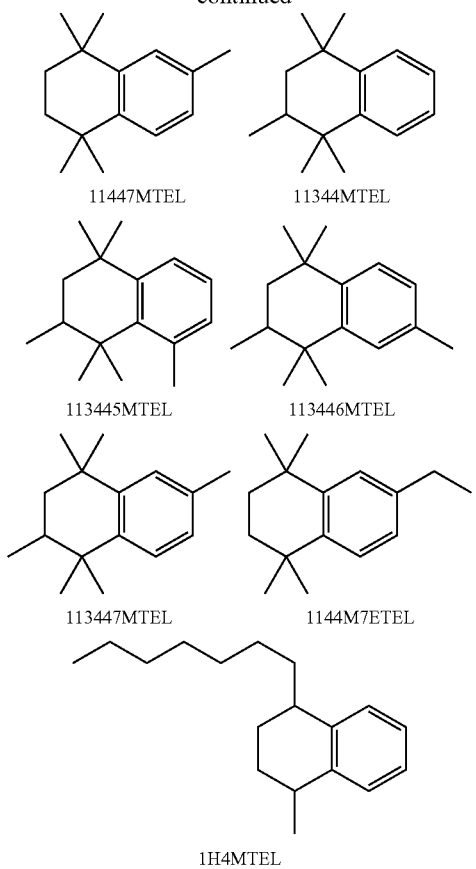

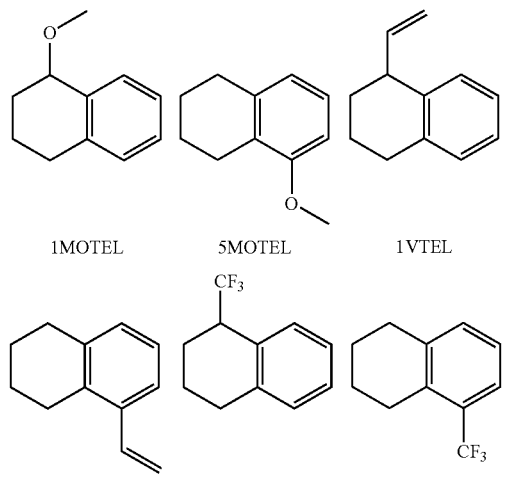

Among these tetralin compounds, tetralin (TEL as represented by the above formula of [Chemical 3]) is desirable because tetralin has an excellent capability of dissolving solutes.

In the general formula (II) representing the polyether compound that is a component (b), the $C_{1-10}$ alkyl group represented by $R_3$ and $R_4$ includes, for example, methyl, ethyl, propyl, isopropyl, butyl, isobutyl, sec-butyl, tert-butyl, amyl, isoamyl, tert-amyl, hexyl, heptyl, octyl, isooctyl, 2-ethylhexyl, nonyl, isononyl, decyl, isodecyl and the like. Among these, $R_3$ is preferably a $C_{1-4}$ alkyl group. $R_4$ is also preferably a $C_{1-4}$ alkyl group.

The specific example of the polyether compound that is a component (b) used in the present invention includes the compounds listed below. These may be used alone or in combination of two or more kinds.

[Chemical 5]

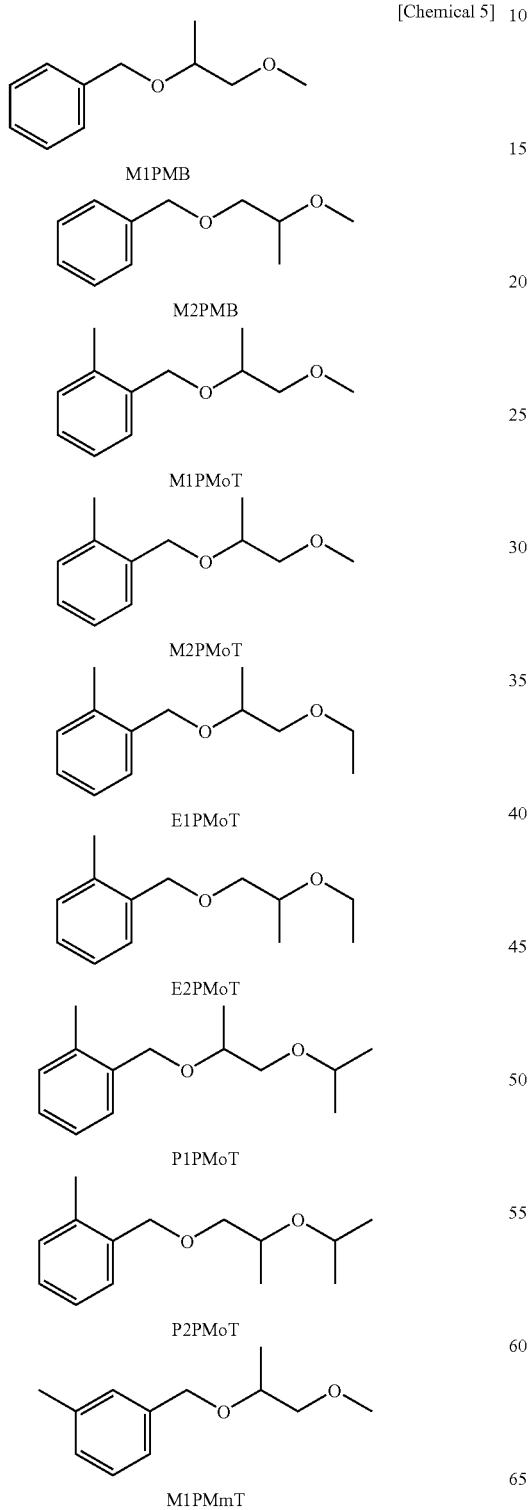

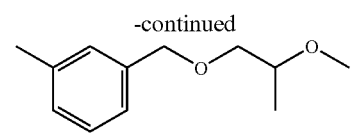

M2PMmT

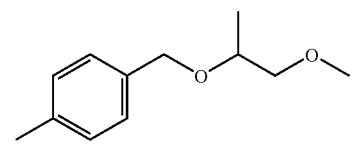

M1PMpT

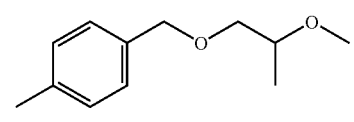

M2PMpT

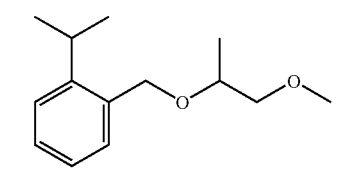

M1PMoCB

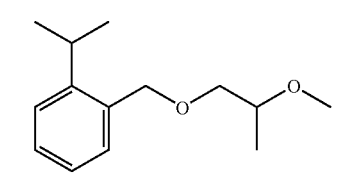

M2PMoCB

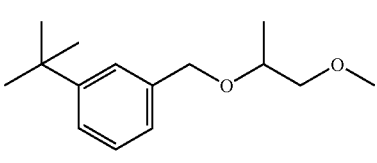

M1PMmTBB

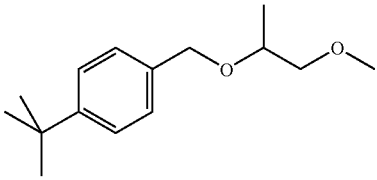

M1PMpTBT

[Chemical 6]

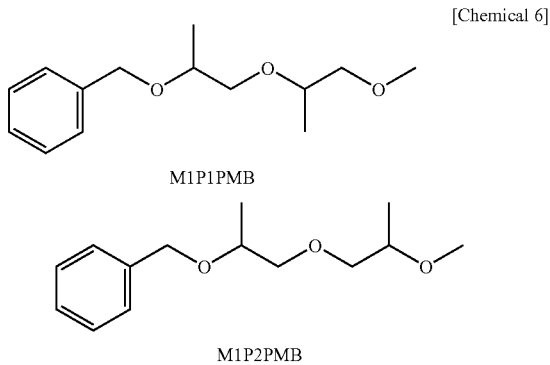

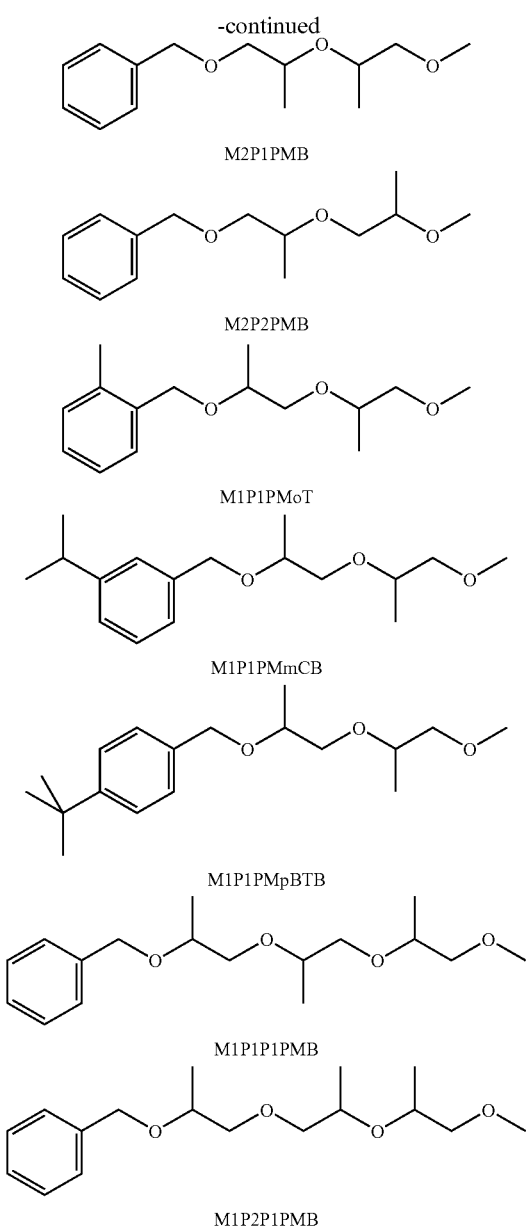

Among these polyether compounds, at least one kind selected from the group consisting of [(2-methoxy-1,2-propoxy)methyl]benzene (M1PMB and M2PMB as represented by the formula of [Chemical 5]) and [(2-methoxy-1,2-propoxy)methyl]toluene (M1PMoT and M2PMoT as represented by the formula of [Chemical 5]) is desirable because the wettability on a coated surface is further improved. In particular, [(2-methoxy-1-methylethoxy)methyl]benzene (M1PMB as represented by the formula of [Chemical 5]) is desirably used.

The solvent composition of the present invention contains the tetralin compound that is a component (a) and the polyether compound that is a component (b). The amount of the component (a) used is preferably from 0.1 mass % to 99.9 mass % and particularly preferably from 5 mass % to 95 mass %. The amount of the component (b) used is preferably from 0.1 mass % to 99.9 mass % and particularly preferably from 5 mass % to 95 mass %. When the component (a) is less than 0.1 mass %, the capability of dissolving solute tends to be insufficient. When the component (b) is less than 0.1 mass %, the wettability tends to be insufficient.

Further, in the solvent composition of the present invention, the total amount of the tetralin compound that is a component (a) and the polyether compound that is a component (b) is preferably from 50 parts to 100 parts by mass and more preferably from 75 parts to 100 parts by mass with respect to 100 parts by mass of the solvent composition of the present invention.

The solvent composition of the present invention may be used by mixing with water and/or the other organic solvents.

The other organic solvents include alcohols such as methanol, ethanol, propanol, isopropanol, butanol, 3-methylbutanol, methylisobutylcarbitol, heptanol, octanol, 2-ethyl-1-hexanol, 3,3,5-trimethyl-1-hexanol, nonanol, cyclohexanol, benzylalcohol, naphtylalcohol, fluorinated alcohols and the like; glycols such as ethylene glycol, diethylene glycol, triethylene glycol, polyethylene glycol, propylene glycol, dipropylene glycol, polypropylene glycol and the like; ether-alcohols such as 3-methoxybutanol, 3-methyl-3-methoxybutanol, ethylene glycol monomethyl ether (methylcellosolve), ethylene glycol monoethyl ether (cellosolve), ethylene glycol monobutyl ether (butylcellosolve), diethylene glycol monoethyl ether (carbitol), diethylene glycol monobutyl ether (butylcarbitol), propylene glycol monomethyl ether and the like; ketones such as acetone, methylethylketone, methylisobutylketone, cyclohexanone, isophorone and the like; heterocyclic compounds such as pyrrolidone, N-methylpyrrolidone, tetrahydrofuran, oxazole, benzofuran, dioxane and the like; amides such as dimethylformamide, dimethylacetamide and the like; sulfones such as dimethylsulfoxide, sulfolane and the like; esters such as methyl acetate, ethyl acetate, butyl acetate, amyl acetate, 3-methoxybutyl acetate, 3-methyl-3-methoxybutyl acetate, 2-ethylhexyl acetate, cyclohexyl acetate, benzyl acetate, methyl lactate, ethyl lactate, butyl lactate, methyl 3-methoxypropionate, ethyl 3-ethoxypropionate and the like; ethers such as dibenzyl ether, anisole and the like; nitro compounds such as nitroethane, nitromethane and the like; nitrile compounds such as acetonitrile and the like; lactones such as γ-butyrolactone and the like; ether esters such as ethylene glycol monomethylether acetate, ethylene glycol monoethyl ether acetate, propylene glycol monomethylether acetate and the like; aromatic hydrocarbons such as benzene, toluene, xylene, cumene, cymene, dihexylbenzene, tetramethylbenzene, diethylbenzene, dibutylbenzene, cyclohexylbenzene, biphenyl, mesitylene, benzyltoluene and the like; condensed-ring hydrocarbons such as decalin, alkyldecalin, tetralin and the like; aliphatic hydrocarbons such as n-hexane, n-heptane, mineral spirit and the like; and alicyclic hydrocarbons such as cyclohexane, alkylcyclohexane, alkylcyclopentane and the like.

The solvent composition of the present invention can be used for such applications as various paints; various adhesives; various inks including offset printing ink, lithographic ink, typographic ink, special ink, gravure printing ink, ballpoint pen ink, and ink-jet printing ink; various coating materials; and the like.

In the case where the solvent composition of the present invention is used for paints, adhesives, inks, coating materials or the like, various polymer materials that serve as a binder may be used in combination. The polymer materials include, for example, natural resins and their derivatives such as rosin, shellac, copal, dammar resin, gilsonite, zein, and cellulose; natural rubbers; various oils and fats; synthetic resins such as acrylic resin (such as polyacrylate and polymethacrylate), vinyl acetate resin, vinyl chloride resin, alkyd resin, polyester resin, novolac resin, urea resin, melamine resin, phenol resin, resorcinol resin, epoxy resin, polyurethane, polyvinylalcohol, xylene resin, ketone resin, chromane-indene resin, petroleum resin, terpene resin, polyamide resin, vinyl chloride-vinyl acetate copolymer resin, polyvinylbutyral, chlorinated polypropylene, styrene resin, polycarbonate, phenoxy resin, and polyacrylonitrile; synthetic rubbers such as chloroprene rubber, nitrile rubber, styrene-butadiene rubber, chlorinated rubber, and cyclized rubber; and the like.

Further, in the case where the solvent composition of the present invention is used for paints, adhesives, inks, coating materials or the like, various fillers and/or pigments may be used in combination. The fillers and pigments include, for example, glass fiber, carbon fiber, cellulose, silica sand, cement, kaolin, clay, aluminum hydroxide, bentonite, talc, silica, silica fine powder, titanium dioxide, carbon black, graphite, iron oxide, bituminous substances, organic pigments, and the like.

Still further, in the case where the solvent composition of the present invention is used for paints, adhesives, inks, coating materials or the like, various surfactants may be used in combination. Any surfactant may be used, including anionic, nonionic, cationic, amphoteric, polymer, and reactive surfactants.

The anionic surfactants include, for example, alkyl sulfates such as sodium dodecylsulfate, potassium dodecylsulfate, and ammonium dodecylsulfate; sodium dodecylpolyglycol ether sulfate; sodium sulforicinoleate; alkyl sulfonates such as alkali metal salts of sulfonated paraffin and ammonium salts of sulfonated paraffin; aliphatic acid salts such as sodium laurate, triethanolamine oleate, and triethanolamine abietate; alkylaryl sulfonates such as sodium benzene sulfonate and alkali metal sulfates of alkaliphenol hydroxyethylene; higher alkylnaphthalene sulfonates; naphthalene sulfonic acid formalin condensates; dialkylsulfosuccinates; polyoxyethylene alkyl sulfates; polyoxyethylene alkylaryl sulfates, and the like.

The nonionic surfactants include, for example, polyoxyethylene polypropylene copolymers, lauryl ether ethylene oxide adducts, cetyl ether ethylene oxide adducts, stearyl ether ethylene oxide adducts, oleyl ether ethylene oxide adducts, octylphenyl ether ethylene oxide adducts, nonylphenyl ether ethylene oxide adducts, bisphenol A ethylene oxide adducts, sorbitan monolaurate, sorbitan monopalmitate, sorbitan monostearate, sorbitan tristearate, sorbitan monooleate, sorbitan trioleate, sorbitan sesquioleate, sorbitan distearate, sorbitan monolaurate ethylene oxide adducts, sorbitan monopalmitate ethylene oxide adducts, sorbitan monostearate ethylene oxide adducts, sorbitan tristearate ethylene oxide adducts, sorbitan monooleate ethylene oxide adducts, sorbitan trioleate ethylene oxide adducts, polyoxyethylene sorbitan tetraoleate, glycerol monostearate, polyethylene glycol monolaurate, polyethylene glycol monostearate, polyethylene glycol distearate, polyethylene glycol monooleate, polyethylene alkylamines, castor oil ethylene oxide adducts, hydrogenated castor oil ethylene oxide adducts, their condensates with polyisocyanate compounds, and the like.

The cationic surfactants include, for example, primary to tertiary amine salts, pyridinium salts, and quaternary ammonium salts.

The amphoteric surfactants include betaine type, sulfate ester type, and sulfonic acid type amphoteric surfactants.

The polymer surfactants include, for example, polyvinylalcohol, sodium poly(metha)acrylate, potassium poly(metha)acrylate, ammonium poly(metha)acrylate, polyhydroxyethyl (metha)acrylate, polyhydroxypropyl (metha)acrylate, copolymers of two or more kinds of the polymerizable monomers of the foregoing polymers, and copolymers of the polymerizable monomers of the foregoing polymers and the other monomers. In addition, crown-ethers, so-called phase-transfer catalyst, are useful as a substance exhibiting surface active properties.

As the reactive surfactants, there may be used any surfactant, indifferent to nonionic, anionic, or cationic, that has an unsaturated bond in the molecule thereof capable of copolymerizing with an unsaturated monomer.

Still further, in the case where the solvent composition of the present invention is used for paints, adhesives, inks, coating materials or the like, plasticizers may be used in combination. The plasticizers include dibutyl phthalate, dioctyl phthalate, dioctyl adipate, dioctyl azelate, triethyl citrate, tributyl acetylcitrate, dibutyl sebacate, dioctyl sebacate, epoxidized animal and vegetable oils, epoxidized fatty acid esters, polyester plasticizers, chlorinated paraffin, and the like.

Still further, in the case where the solvent composition of the present invention is used for paints, adhesives, inks, coating materials or the like, optionally additives such as corrosion inhibitors, antiseptics, defoaming agents, stabilizers, oxidation inhibitors, and viscosity improvers are admixed as necessary.

Still further, the paints, adhesives, inks, coating materials or the like that use the solvent composition of the present invention may be applied to various substrates. The substrates include, for example, polymer materials such as polyethersulfone, polyethylene terephthalate, polycarbonate, polyetheretherketone, polyvinyl fluoride, polyacrylate, polymethylmethacrylate, polyamide, polypropylene, polyethylene, cycloolefin polymers, amorphous polyolefins, and fluoropolymers; and inorganic materials such as glass and ceramics.

The solvent composition of the present invention may be further used as a solvent that dissolves various organic compounds in the production of electronic devices such as optical recording materials, organic EL elements, and field effect transistors wherein conventional printing techniques are used.

The optical recording materials are composed of a dye layer that contains an optical memory dye, a PC substrate, a reflection film, and others. The optical memory dye includes, for example, cyanine dyes, phthalocyanine dyes, naphthalocyanine dyes, naphtholactam dyes, picoline dyes, azo dyes, phenothiazine dyes, pyrylium dyes, thiopyrylium dyes, squarylium dyes, azulenium dyes, indophenols dyes, indoaniline dyes, triphenylmethane dyes, quinone dyes, anthraquinone dyes, aminium dyes, diimmonium dyes, and metal complex salt dyes.

The organic EL element is composed of a light-emitting layer containing a light-emitting material, a substrate, an ITO anode, a hole injection layer, a hole conducting layer, an electron transporting layer, an Al cathode, and others. The light-emitting material includes, for example, fluorene derivatives, paraphenylene vinylene derivatives, polyphenylene derivatives, polyvinylcarbazole, polythiophene derivatives, perylene dyes, coumalin dyes, rhodamine dyes, pyran dyes, anthrone dyes, porphyrin dyes, quinacridone dyes, N,N'-dialkyl-substituted quinacridone dyes, naphthalimide dyes, N,N'-diaryl-substituted pyrrolopyrrole dyes, and the like.

The field effect transistor is composed of a semiconductor layer containing an organic semiconductor material, an insulating layer, a gate electrode, a source electrode, a drain electrode, and others. The organic semiconductor material includes, for example, perylene dyes such as N,N'-dialkylperylene-3,4,9,10-tetracarboxylic acid dimides; naphthalene-1,4,5,8-tetracarboxylic acid dimides; various metal phthalocyanines; nitrofluorenones; substituted fluorene-malononitrile adducts; halogenated anthroanthrone; tri(8-hydroxyquinoline)aluminum; oligomers and polymers that contain the foregoing materials; and the like.

The solvent composition of the present invention may be also used as a detergent to remove rosin-based solder flux used for printed circuit boards, liquid crystal cells and others, and to remove stains composed mainly of organic matter such as oils present on a solid surface of electronic components and precision machines. The solid surface includes, for example, metallic portions of precision components; metallic portions of electronic components such as jigs and tools used for assembling precision components; etched components such as printed circuits, integrated circuits, and shadow masks; and the like.

In the case where the solvent composition of the present invention is used as a detergent, a surfactant may be used in combination. As the surfactant, any one of the anionic, cationic, amphoteric, and nonionic surfactants may be used, but a nonionic surfactant is preferred considering the effect on the surface to be cleaned.

Further, in the case where the solvent composition is used as a detergent, organic acids such as citric acid, tartaric acid and phthalic acid; alkanol amines such as monoethanol amine and diethanolamine; corrosion inhibitors; antiseptics; defoaming agents; stabilizers; oxidation inhibitors; and others are optionally admixed with the solvent composition as necessary.

Various cleaning processes may be employed, which include dipping, ultrasonic cleaning, swaying, spraying, vapor cleaning, hand wiping, water displacement drying, and the like.

EXAMPLE

Hereinafter, the solvent composition of the present invention will be further explained in detail with reference to the following examples, but it should be construed that the invention is in no way limited to those examples.

Examples 1 to 5

Solvent compositions S1 to S5 with the compositions shown in Table 1 were prepared.

TABLE 1

|  |  |  | Example | | | | |
|---|---|---|---|---|---|---|---|
|  |  |  | 1 | 2 | 3 | 4 | 5 |
| Solvent composition |  |  | S1 | S2 | S3 | S4 | S5 |
| Composition | (a) | TEL | 90 | 85 | 80 |  |  |
| (parts by |  | 15MTEL |  |  |  | 90 | 80 |
| mass) | (b) | M1PMB | 10 | 15 | 10 |  | 10 |
|  |  | M1P1PMB |  |  | 10 | 10 | 10 |
| Appearance |  |  | Colorless clear | Colorless clear | Colorless clear | Colorless clear | Colorless clear |

Comparative Examples 1 to 5

Solvent compositions HS1 to HS5 with the compositions shown in Table 2 were prepared.

TABLE 2

|  |  | Comparative Example | | | | |
|---|---|---|---|---|---|---|
|  |  | 1 | 2 | 3 | 4 | 5 |
| Solvent composition |  | HS1 | HS2 | HS3 | HS4 | HS5 |
| Composition | (a) TEL |  |  |  | 85 |  |
| (parts by | Methyl- | 90 | 85 | 80 |  | 85 |
| mass) | naphthalene |  |  |  |  |  |
|  | (b) M1PMB |  |  |  |  | 15 |
|  | Ethyl- | 10 | 15 | 20 | 15 |  |
|  | cellosolve |  |  |  |  |  |
| Appearance |  | Colorless clear | Colorless clear | Colorless clear | Colorless clear | Colorless clear |

Evaluation Example

The following evaluation and measurement were performed for the solvent compositions obtained in the Examples and Comparative Examples, and the other solvents (including TEL alone and M1PMB alone).

Odor Evaluation

Sensory odor evaluation was performed by ten examiners, and graded into three levels, Good: almost odorless, Do: odorous, and Poor: highly odorous.

Capability of Dissolving Solutes

The solutes (organic compounds) shown in Table 3 were added in an amount of 5 mass %; after 1 hour stirring at 30° C., the capability of dissolving the solutes was evaluated by visual observation, and was graded into three levels, Good: fully dissolved, Do: only a little amount of solutes was found to be undissolved, and Poor: totally or almost undissolved.

Contact Angle Measurement

A 10 μL aliquot of a solvent was dropped on a glass substrate (MICRO SLIDE GLASS S 1226, manufactured by Matsunami Glass Ind., Ltd.) that was washed with a neutral detergent, rinsed with ultra-pure water, and dried; and then the contact angle was measured with CONTACT-ANGLE METER CA-D manufactured by Kyowa Interface Science Co., Ltd. at room temperature of 22° C. to 25° C. and relative humidity of 50% to 70%. The contact angle was measured six times, and the average value (unit: degree) of contact angle was obtained from the values excluding the maximum and minimum values.

When the contact angle exceeds 20 degree, the coating becomes difficult. On the other hand, when the contact angle is 15 degree or less, the coating becomes particularly preferable.

The results of the evaluations and measurements are shown in Table 3.

As is clear from the results shown in Table 3, a solvent composition obtained by combining a naphthalene-based solvent and an ether-based solvent had excellent capability of dissolving various organic compounds that are used as a binder, but the solvent composition was highly odorous, and had a large contact angle and poor wettability to substrates (Comparative Examples 1 to 3). A solvent composition obtained by combining a naphthalene-based solvent and the specific polyether compound used in the present invention also gave the similar performances as described above (Comparative Example 5). Further, a solvent composition that was obtained by combining the specific tetralin compound used in the present invention and the ether-based solvent (ethylcellosolve) other than the specific polyether compound used in the present invention had excellent capability of dissolving solutes, but the solvent composition was odorous and had disadvantages in safety issues (Comparative Example 4).

Note that, the specific tetralin compound used in the present invention exhibited poor wettability when used alone (TEL). The specific polyether compound used in the present invention exhibited poor capability of dissolving solutes when used alone (M1PMB).

On the other hand, the solvent compositions of the present invention containing a specific tetralin compound and a specific polyether compound are almost odorless, having excellent capability of dissolving various organic compounds and excellent wettability to substrates.

INDUSTRIAL APPLICABILITY

The solvent composition of the present invention is excellent in safety and almost odorless, having an excellent capability of dissolving various organic materials and an excellent affinity to various substrates. The solvent composition can be suitably used for various applications including various kinds of paints, adhesives, coating materials, and detergents.

TABLE 3

| Solvent composition | Odor | Capability of dissolving solutes | | | | | | Contact angle |
| --- | --- | --- | --- | --- | --- | --- | --- | --- |
| | | Solute 1[2] | Solute 2[3] | Solute 3[4] | Solute 4[5] | Solute 5[6] | Solute 6[7] | |
| S1 (Example 1) | Good | Good | Good | Good | Good | Good | Good | 15 |
| S2 (Example 2) | Good | Good | Good | Good | Good | Good | Good | 15 |
| S3 (Example 3) | Good | Good | Good | Good | Good | Good | Good | 13 |
| S4 (Example 4) | Good | Good | Good | Good | Good | Good | Good | 14 |
| S5 (Example 5) | Good | Good | Good | Good | Good | Good | Good | 13 |
| HS1 (Comparative Example 1) | Poor | Good | Good | Good | Good | Good | Good | 18 |
| HS2 (Comparative Example 2) | Poor | Good | Good | Good | Good | Good | Good | 17 |
| HS3 (Comparative Example 3) | Poor | Good | Good | Good | Good | Good | Good | 16 |
| HS4 (Comparative Example 4) | Do | Good | Good | Good | Good | Good | Good | 15 |
| HS5 (Comparative Example 5) | Poor | Good | Good | Good | Good | Good | Good | 16 |
| TEL | Good | Good | Good | Good | Good | Good | Do | 21 |
| M1PMB | Good | Do | Do | Do | Do | Do | Good | 11 |

[2]Solute 1 = ER-1002 (polyester, manufactured by Mitsubishi Rayon Co., Ltd.)
[3]Solute 2 = QP x 2B (polystyrene, manufactured by Denki Kagaku Kogyo Kabushiki Kaisha)
[4]Solute 3 = MS-300 (MMA-styrene copolymer, manufactured by Nippon Steel Chemical Co., Ltd.)
[5]Solute 4 = ACRYDIC A-405 (acrylic resin, manufactured by Dainippon Ink and Chemicals Inc.)
[6]Solute 5 = PKH-H (phenoxy resin, manufactured by Union Carbide Corp.)
[7]Solute 6 = P1800NT11 (polysulfone, manufactured by Amoco Corp.)

The invention claimed is:

1. A solvent composition comprising:
a tetralin compound (a) represented by the following general formula (I) and a polyether compound (b) represented by the following general formula (II):

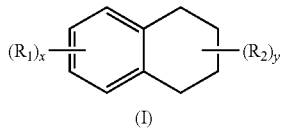

(I)

wherein x is an integer of 0 to 4; y is an integer of 0 to 8; $R_1$ and $R_2$ each independently represent an alkyl or alkoxy group having 1 to 10 carbon atoms or an alkenyl or alkenyloxy group having 2 to 10 carbon atoms; these groups may be substituted by a halogen atom; and when a plurality of $R_1$ or $R_2$ exists, $R_1$ and $R_2$ each may be the same or different,

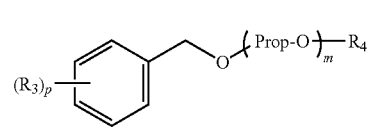

(II)

wherein m is 1 to 10; p is 0, 1, 2, or 3; Prop represents 1,2-propylene group; $R_3$ and $R_4$ each independently represent an alkyl group having 1 to 10 carbon atoms; and when m is 2 or more, a methyl substituent in the 1,2-propylene group represented by Prop may be randomly positioned.

2. The solvent composition according to claim 1, wherein the tetralin compound (a) is tetralin.

3. The solvent composition according to claim 1, wherein the polyether compound (b) is [(2-methoxy-1-methylethoxy)methyl] benzene.

4. The solvent composition according to claim 2, wherein the polyether compound (b) is [(2-methoxy-1-methylethoxy)methyl] benzene.

* * * * *